US011251915B2

United States Patent
Wang et al.

(10) Patent No.: US 11,251,915 B2
(45) Date of Patent: Feb. 15, 2022

(54) TECHNIQUES FOR UPLINK TRANSMISSIONS

(71) Applicant: QUALCOMM Incorporated, San Diego, CA (US)

(72) Inventors: Renqiu Wang, San Diego, CA (US); Yi Huang, San Diego, CA (US); Wanshi Chen, San Diego, CA (US); Peter Gaal, San Diego, CA (US); Seyong Park, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/979,049

(22) Filed: May 14, 2018

(65) Prior Publication Data

US 2018/0331803 A1 Nov. 15, 2018

Related U.S. Application Data

(60) Provisional application No. 62/506,410, filed on May 15, 2017.

(51) Int. Cl.
*H04L 5/00* (2006.01)
*H04W 52/34* (2009.01)
(Continued)

(52) U.S. Cl.
CPC .......... *H04L 5/0048* (2013.01); *H04L 5/0007* (2013.01); *H04L 5/0053* (2013.01);
(Continued)

(58) Field of Classification Search
CPC ......... H04W 72/0453; H04W 72/0413; H04W 72/0466; H04W 72/04; H04W 72/0406;
(Continued)

(56) References Cited

U.S. PATENT DOCUMENTS 8,908,793 B2 * 12/2014 Han ...................... H04L 5/0007
375/295
9,059,756 B2 6/2015 Gaal et al.
(Continued)

FOREIGN PATENT DOCUMENTS

CN 101483909 A 7/2009
EP 1067704 A2 1/2001
(Continued)

OTHER PUBLICATIONS

Ericsson: "On the Design of 2-Symbols PUCCH," 3GPP Draft; R1-1709082, 3rd Generation Partnership Project (3GPP), Mobile Competence Centre; 650, Route Des Lucioles; F-06921 Sophia-Antipolis Cedex; France, vol. RAN WG1, no. Hangzhou, China; May 15, 2017-May 19, 2017, May 14, 2017, XP051274240, 4 pages, Retrieved from the Internet: URL: http://www.3gpp.org/ftp/Meetings_3GPP_SYNC/RAN1/Docs/ [retrieved on May 14, 2017].
(Continued)

*Primary Examiner* — Asad M Nawaz
*Assistant Examiner* — Najeeb Ansari
(74) *Attorney, Agent, or Firm* — Arent Fox, LLP (57) ABSTRACT

Various aspects described herein relate to techniques for uplink transmissions in wireless communication systems. In an aspect, a method includes receiving, by a user equipment (UE), hopping information for two consecutive symbols, generating, by the UE, a first symbol of the two consecutive symbols using a format, generating, by the UE, a second symbol of the two consecutive symbols based on the format and the hopping information, and transmitting, by the UE, the two consecutive symbols in an uplink signal.

35 Claims, 7 Drawing Sheets

(51) Int. Cl.

| | | |
|---|---|---|
| *H04W 52/28* | (2009.01) | |
| *H04W 52/14* | (2009.01) | |
| *H04W 52/24* | (2009.01) | |
| *H04W 52/32* | (2009.01) | |
| *H04W 52/36* | (2009.01) | |
| *H04W 72/04* | (2009.01) | |
| *H04W 52/06* | (2009.01) | |
| *H04W 52/42* | (2009.01) | |
| *H04W 52/26* | (2009.01) | |

(52) U.S. Cl.
CPC ......... *H04L 5/0091* (2013.01); *H04W 52/146* (2013.01); *H04W 52/248* (2013.01); *H04W 52/281* (2013.01); *H04W 52/325* (2013.01); *H04W 52/346* (2013.01); *H04W 52/367* (2013.01); *H04L 5/001* (2013.01); *H04L 5/0012* (2013.01); *H04L 5/0023* (2013.01); *H04W 52/06* (2013.01); *H04W 52/243* (2013.01); *H04W 52/262* (2013.01); *H04W 52/42* (2013.01); *H04W 72/0413* (2013.01); *H04W 72/0446* (2013.01)

(58) Field of Classification Search
CPC ......... H04W 72/1284; H04W 74/0833; H04W 72/14

See application file for complete search history.

(56) References Cited

U.S. PATENT DOCUMENTS

| | | | | |
|---|---|---|---|---|
| 2005/0195908 | A1* | 9/2005 | Dunn | H04L 1/0025 375/260 |
| 2006/0217141 | A1 | 9/2006 | Legg et al. | |
| 2007/0115800 | A1* | 5/2007 | Fonseka | H04L 1/0054 370/208 |
| 2009/0042530 | A1* | 2/2009 | Wang | H04L 5/0007 455/334 |
| 2009/0185476 | A1* | 7/2009 | Tsai | H04L 27/2602 370/210 |
| 2011/0292899 | A1 | 12/2011 | Yu et al. | |
| 2012/0039270 | A1* | 2/2012 | Nguyen | H04J 11/003 370/329 |
| 2012/0163159 | A1 | 6/2012 | Luo et al. | |
| 2012/0269138 | A1* | 10/2012 | Han | H04L 1/0073 370/329 |
| 2013/0114505 | A1* | 5/2013 | Haim | H04W 52/146 370/328 |
| 2015/0155994 | A1 | 6/2015 | Papasakellariou et al. | |
| 2016/0095105 | A1 | 3/2016 | Chen et al. | |
| 2016/0278020 | A1* | 9/2016 | Proctor, Jr. | H04W 52/42 |
| 2017/0223743 | A1* | 8/2017 | Lin | H04B 1/713 |
| 2017/0289928 | A1 | 10/2017 | Wang | |
| 2017/0302479 | A1* | 10/2017 | Mysore Balasubramanya | H04L 1/0054 |
| 2018/0006779 | A1* | 1/2018 | Yi | H04W 4/70 |
| 2018/0054792 | A1* | 2/2018 | Lee | H04L 5/00 |
| 2018/0084593 | A1* | 3/2018 | Chen | H04W 76/11 |
| 2018/0152924 | A1* | 5/2018 | Ouchi | H04W 48/10 |
| 2018/0279291 | A1 | 9/2018 | Tiirola et al. | |
| 2018/0331807 | A1* | 11/2018 | Kim | |
| 2018/0332539 | A1 | 11/2018 | Fan et al. | |
| 2018/0332542 | A1 | 11/2018 | Wang et al. | |
| 2019/0007175 | A1* | 1/2019 | Kwak | H04L 5/00 |
| 2019/0190687 | A1* | 6/2019 | Yi | H04L 5/003 |
| 2019/0190751 | A1* | 6/2019 | Nguyen | H04L 5/001 |

FOREIGN PATENT DOCUMENTS

| | | |
|---|---|---|
| WO | 2012064517 A2 | 5/2012 |
| WO | 2016029460 A1 | 3/2016 |

OTHER PUBLICATIONS

International Search Report and Written Opinion—PCT/US2018/032762—ISA/EPO—dated Sep. 24, 2018.

Qualcomm Incorporated: "Channel Multiplexing for long PUCCH," 3GPP Draft; R1-1708619_Channel Multiplexing for Long PUCCH, 3rd Generation Partnership Project (3GPP), Mobile Competence Centre; 650, Route Des Lucioles; F-06921 Sophia-Antipolis Cedex; France, vol. RAN WG1, no. Hangzhou, CN; May 15, 2017-May 19, 2017, May 14, 2017, XP051273808, 8 pages, Retrieved from the Internet: URL: http://www.3gpp.org/ftp/Meetings_3GPP_SYNC/RAN1/Docs/ [retrieved on May 14, 2017].

Qualcomm Incorporated: "Resource Allocation for PUCCH," 3GPP Draft; R1-1718806 Resource Allocation for PUCCH, 3rd Generation Partnership Project (3GPP), Mobile Competence Centre; 650, Route Des Lucioles; F-06921 Sophia-Antipolis Cedex; France, vol. RAN WG1, no. Prague, CZ; Oct. 9, 2017-Oct. 13, 2017, Oct. 8, 2017, XP051341951, 10 pages, Retrieved from the Internet: URL: http://www.3gpp.org/ftp/Meetings_3GPP_SYNC/RAN1/Docs/ [retrieved on Oct. 8, 2017].

CATT: "PUSCH Power Control In Multi-Beam Configuration", 3GPP Draft; R1-1707529 PUSCH_POWER CONTROL_MULTI-BEAM, 3rd Generation Partnership Project (3GPP), Mobile Competence Centre; 650, Route Des Lucioles; F-06921, Sophia-Antipolis Cedex; France, vol. RAN WG1, no. Hangzhou, China; May 15, 2017-May 19, 2017 May 14, 2017, XP051272737, Retrieved from the Internet: URL:http://www.3gpp.org/ftp/Meetings_3GPP_SYNC/RAN1/Docs/ [retrieved on May 14, 2017], 7 pages.

* cited by examiner

TECHNIQUES FOR UPLINK TRANSMISSIONS

CROSS-REFERENCE TO RELATED APPLICATION

This application claims the benefit of U.S. Provisional Application Ser. No. 62/506,410, entitled "UPLINK POWER CONTROL IN NEW RADIO (NR)" and filed on May 15, 2017, which is expressly incorporated by reference herein in its entirety.

BACKGROUND

Aspects of the present disclosure relate generally to wireless communication systems, and more particularly, to techniques for uplink transmissions having one or more symbols in wireless communications (e.g., 5G New Radio).

Wireless communication systems are widely deployed to provide various telecommunication services such as telephony, video, data, messaging, and broadcasts. Typical wireless communication systems may employ multiple-access technologies capable of supporting communications with multiple users by sharing available system resources (e.g., time, frequency, power, and/or spectrum). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA).

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communication systems continues to increase.

The 5th Generation (5G) New Radio (NR) communications technology, used in a wide range of spectrum, is envisaged to expand and support diverse usage scenarios and applications with respect to conventional mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, higher capacity, higher spectral efficiency, and lower latency, new or improved approaches may be desirable to enhance uplink transmissions, in order to satisfy consumer demand and improve user experience in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method related to uplink transmissions in a wireless communication system is provided. The method includes receiving, by a user equipment (UE), hopping information for two consecutive symbols, generating, by the UE, a first symbol of the two consecutive symbols using a format, generating, by the UE, a second symbol of the two consecutive symbols based on the format and the hopping information, and transmitting, by the UE, the two consecutive symbols in an uplink signal.

In an aspect, an apparatus for wireless communications is provided that includes a transmitter, a receiver, a memory configured to store instructions, and at least one processor communicatively coupled with the receiver, the transmitter and the memory. In an example, the at least one processor is configured to execute the instructions to receive, via the receiver, hopping information for two consecutive symbols, generate a first symbol of the two consecutive symbols using a format, generate a second symbol of the two consecutive symbols based on the format and the hopping information, and transmit, via the transmitter, the two consecutive symbols in an uplink signal.

In another aspect, an apparatus for wireless communications is provided that includes means for receiving hopping information for two consecutive symbols, means for generating a first symbol of the two consecutive symbols using a format, means for generating a second symbol of the two consecutive symbols based on the format and the hopping information, and means for transmitting the two consecutive symbols in an uplink signal.

In yet another aspect, a computer-readable medium (e.g., a non-transitory computer-readable medium) storing computer code executable by at least one processor for managing uplink transmissions in wireless communications is provided. The computer-readable medium may include code for receiving hopping information for two consecutive symbols, code for generating a first symbol of the two consecutive symbols using a format, code for generating a second symbol of the two consecutive symbols based on the format and the hopping information, and code for transmitting the two consecutive symbols in an uplink signal.

According to another example, a method related to uplink transmissions in a wireless communication system is provided. In an aspect, the method includes transmitting hopping information to be used by a UE to generate two consecutive symbols, receiving an uplink signal including at least the two consecutive symbols, decoding a first symbol of the two consecutive symbols using a format, and decoding a second symbol of the two consecutive symbols based on the format and the hopping information.

In another aspect, an apparatus for wireless communications is provided that includes a transmitter, a receiver, a memory configured to store instructions, and at least one processor communicatively coupled with the receiver, the transmitter and the memory. In an example, the at least one processor is configured to execute the instructions to transmit, via the transmitter, hopping information to be used by a UE to generate two consecutive symbols, receive, via the receiver, an uplink signal including at least the two consecutive symbols, decode a first symbol of the two consecutive symbols using a format, and decode a second symbol of the two consecutive symbols based on the format and the hopping information.

In yet another aspect, an apparatus for wireless communications is provided that includes means for transmitting hopping information to be used by a UE to generate two consecutive symbols, means for receiving an uplink signal including at least the two consecutive symbols, means for decoding a first symbol of the two consecutive symbols using a format, and means for decoding a second symbol of the two consecutive symbols based on the format and the hopping information.

In a further aspect, a computer-readable medium (e.g., a non-transitory computer-readable medium) storing computer code executable by at least one processor for managing uplink transmissions and receptions in wireless communications is provided. The computer-readable medium may include code for transmitting hopping information to be used by a UE to generate two consecutive symbols, code for receiving an uplink signal including at least the two consecutive symbols, code for decoding a first symbol of the two consecutive symbols using a format, and code for decoding a second symbol of the two consecutive symbols based on the format and the hopping information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

In a conventional communications system (e.g., an LTE system), physical resources may be assigned on two resource blocks (RBs) in a subframe. The subframe may comprise fourteen (14) orthogonal frequency division multiplexing (OFDM) symbols in time domain, and each OFDM symbol has twelve (12) sub-carriers or tones in frequency domain. In an aspect, an LTE subframe may include uplink (UL) signal and/or downlink (DL) signal, and the UL signal and/or DL signal may be time division multiplexed (TDMed). In an aspect, the subframe may be transmitted in an UL signal having no uplink short burst (ULSB).

In a 5th Generation (5G) New Radio (NR) communications system, every slot or subframe may be mixed with UL and/or DL signals. In some examples, an UL signal may include 14 symbols. In some examples, an ULSB may be used, comprising one or two symbols (e.g., OFDM symbols). In an example, the UL signal may include 13 or less symbols in an UL long burst and 1 symbol in an ULSB. In another example, the UL signal may include 12 or less symbols in an UL long burst and 2 symbols used in an ULSB. In yet another example, the UL signal may include only a ULSB having one symbol or two symbols and the rest of the symbols in the slot may be used for DL transmission or gap. In some aspects, an UL signal may be a long Physical Uplink Control Channel (PUCCH), or a short PUCCH, or a Physical Uplink Shared Channel (PUSCH), with duration from one (1) to fourteen (14) symbols. In some aspects, one or two symbol signals (e.g., one-symbol ULSB or two-symbol ULSB) may be supported or used in UL transmissions. For example, an ULSB including one or two symbols may be used and may carry uplink control information (UCI) or UL data. In an example, the first symbol or second symbol in an ULSB may be a PUCCH, and may be either sequence-based design or frequency division multiplexing (FDM)-based design. In some cases, only one symbol is used in an ULSB. In some other cases, when using two-symbol ULSB, the configuration and format used for the second symbol may need to be defined. As such, new approaches or schemes may be desired to design and configure the two-symbol UL signals (e.g., a two-symbol ULSB).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to a wireless communication system (e.g., a 5G NR system), in particular, techniques for one-symbol or two-symbol uplink transmissions. In some aspects, a one-symbol or two-symbol uplink signal (e.g., an ULSB) may carry some control information (e.g., UCI, which may be considered as critical information). In an aspect, different formats may be used for the one-symbol or two-symbol uplink signal. For example, Format 0 may be used, having 1 or 2 bits configured for UCI. In another example, Format 2 may be used, having at least 3 bits configured for UCI. In one implementation, when using Format 0, 1 bit (e.g., "0" or "1") of one symbol or each of the two symbols may be configured for the UCI to indicate "ACK" or "NACK" for signal transmissions (e.g., hybrid automatic repeat request (HARQ) transmissions). In some cases, for two-symbol design, both symbols may use Format 0 with each symbol having a 1-bit indication.

In some aspects, the one-symbol UL signal, or the first symbol of the two-symbol uplink signal may either use sequence-based design or FDM-based design. For example, for sequence-based design, the data tones of the symbol may use different sequences compared with the sequences used for the reference signals (e.g., demodulation reference signals (DMRSs)) of the symbol. In some implementations, the sequences discussed herein may be Chu sequences or computer generated sequences (CGS) with low PAPR property for sequence based design, e.g., Format 0, or Pseudo-random sequences for FDM based design for Format 2. In some cases, for FDM-based design, the data tones of the symbol may use different frequencies compared with the frequencies used by the reference signals (e.g., DMRSs) of the symbol.

Each of the aspects described above are performed or implemented in connection with FIGS. 1A-4, which are described in more detail below.

Figure 1A:
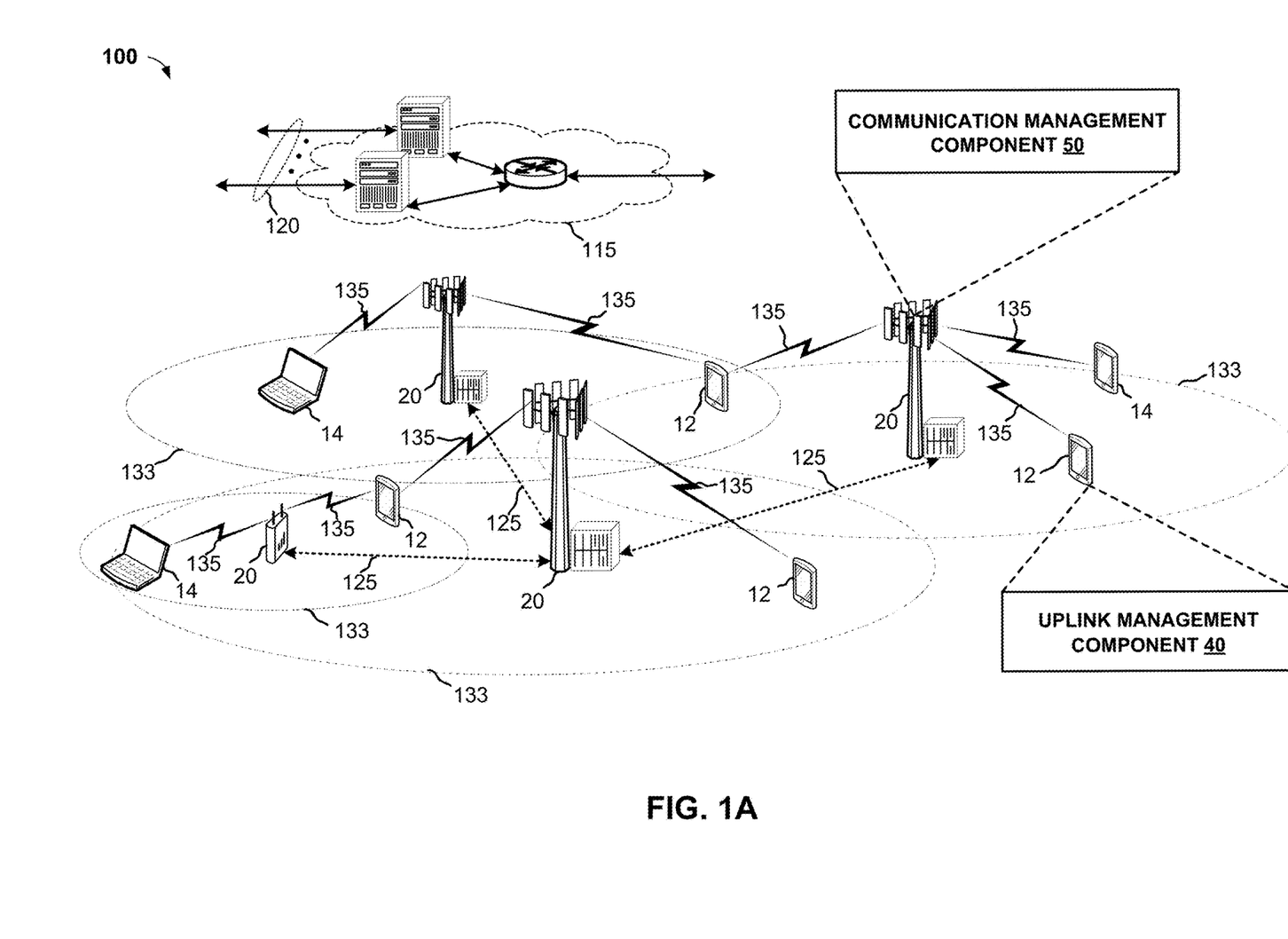
FIG. 1A is a schematic diagram of a wireless communication network including one or more user equipments (UEs) and at least one network entity having respective communication components for enhanced uplink transmissions or receptions, according to one or more of the presently described aspects.
Figure 1B:
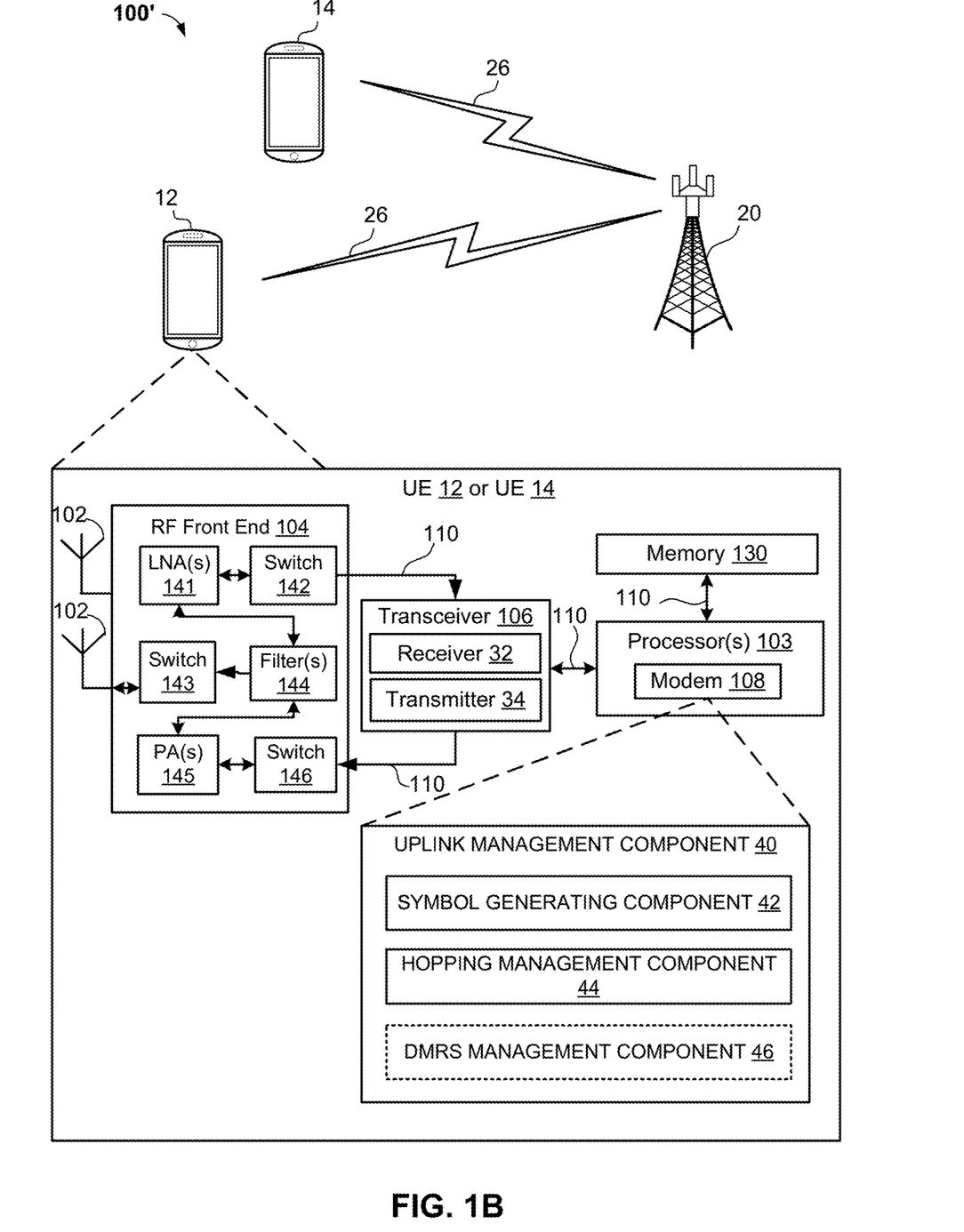
FIG. 1B is a block diagram of an example communications network including one or more UEs configured to transmit uplink (UL) signals to at least one network entity, according to one or more of the presently described aspects.
Figure 1C:
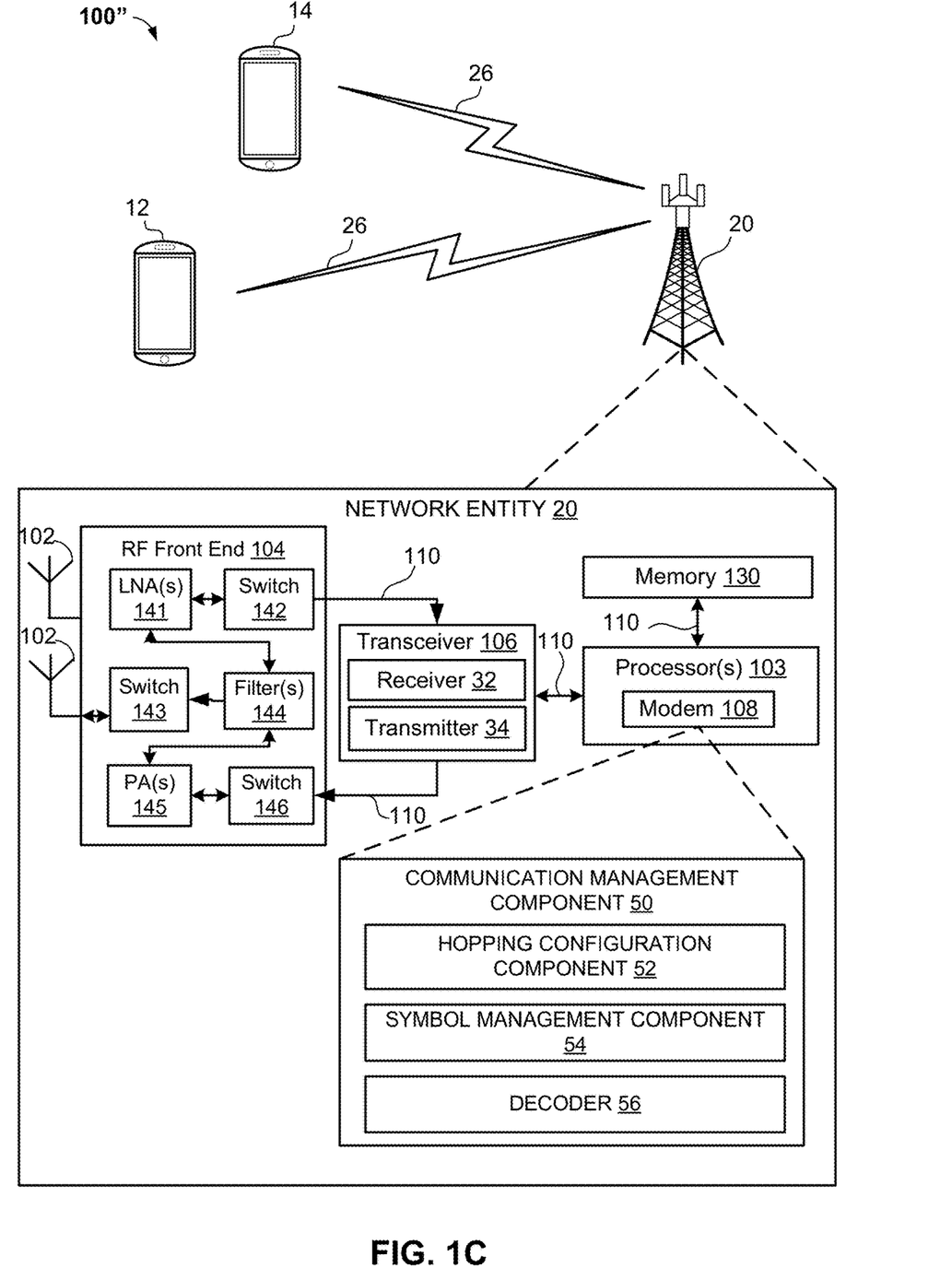
FIG. 1C is a block diagram of an example communications network including at least one network entity configured to receive UL signals from one or more UEs, according to one or more of the presently described aspects.

Referring to FIG. 1A, FIG. 1B, and FIG. 1C, in an aspect, a wireless communication system (e.g., wireless communication system or network 100, 100', or 100") includes at least one UE 12 or UE 14 in communication coverage of at least one network entity 20 (e.g., a base station or gNB, or a cell thereof, in a 5G NR network). UE 12 and/or UE 14 may communicate with a network via the network entity 20. In some aspects, multiple UEs including at least the UE 12 and/or UE 14 may be in communication coverage with one or more network entities, including network entity 20. In an aspect, the network entity 20 may be a base station such as a gNB in a 5G NR network. Although various aspects are described in relation to the Universal Mobile Telecommunications System (UMTS), LTE, or 5G NR networks, similar principles may be applied in other wireless wide area networks (WWAN). The wireless network may employ a scheme where multiple UEs may transmit on a channel. In an example, the UE 12 and/or UE 14 may transmit and/or receive wireless communications to and/or from the network entity 20. For example, the UE 12 and/or UE 14 may be actively communicating with the network entity 20.

In some aspects, the UE 12 and/or UE 14 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 and/or UE 14 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things (IoT), or any other similar functioning device. Additionally, a UE 12 or 14 may be a machine-to-machine (M2M) type of device, e.g., a low power, low data rate (relative to a wireless phone, for example) type of device, that may in some aspects communicate infrequently with a wireless communication network or other UEs. A UE 12 or 14 may be able to communicate with various types of network entities 20 and network equipment including macro eNBs, small cell eNBs, macro gNBs, small cell gNBs, relay base stations, and the like.

Moreover, the network entity 20 may be a macrocell, picocell, femtocell, relay, Node B, mobile Node B, small cell box, UE (e.g., communicating in peer-to-peer or ad-hoc mode with the UE 12 and/or UE 14), or substantially any type of component that can communicate with the UE 12 and/or UE 14 to provide wireless network access to the UE 12 and/or UE 14. In some examples, the network entity 20 may be referred to as a base transceiver station, a radio base station, an access point (AP), an access node (AN), a radio transceiver, an eNodeB (eNB), a gNB, a Home NodeB, a Home eNodeB, a relay, or some other suitable terminology.

Referring to FIG. 1A, in accordance with various aspects of the present disclosure, an example of a wireless communication network 100, such as a 5G NR network, includes at least one UE 12 (or UE 14) with a modem 108 having a uplink management component 40 that enables UE 12 to exchange signaling with a modem 108 and a communication management component 50 of at least one network entity 20 (e.g., a gNB).

The wireless communication network 100 may include one or more network entities 20, one or more UEs 12 or 14, and a core network 115. The core network 115 may provide user authentication, access authorization, tracking, internet protocol (IP) connectivity, and other access, routing, or mobility functions. The network entities 20 may interface with the core network 115 through backhaul links 120 (e.g., S1, etc.). The network entities 20 may perform radio configuration and scheduling for communication with the UEs 12 or 14, or may operate under the control of a base station controller (not shown). In various examples, the network entities 20 may communicate, either directly or indirectly (e.g., through core network 115), with one another over backhaul links 125 (e.g., X1, etc.), which may be wired or wireless communication links.

The network entities 20 may wirelessly communicate with the UEs 12 or 14 via one or more antennas 102. Each of the network entities 20 may provide communication coverage for a respective geographic coverage area 133. In some cases, the geographic coverage area 133 for a network entity 20 may be divided into sectors or cells making up only a portion of the coverage area (not shown). The wireless communication network 100 may include network entities 20 of different types (e.g., macro base stations or small cell base stations, described below). Additionally, the plurality of network entities 20 may operate according to different ones of a plurality of communication technologies (e.g., 5G NR", LTE, Wi-Fi, Bluetooth, etc.), and thus there may be overlapping geographic coverage areas 133 for different communication technologies.

In some examples, the wireless communication network 100 may be or include one or any combination of communication technologies, including a 5G NR technology, an LTE or LTE-Advanced (LTE-A) or MuLTEfire technology, a Wi-Fi technology, a Bluetooth technology, or any other long or short range wireless communication technology. In 5G NR, the term gNB may be generally used to describe the network entities 20, while the term UE may be generally used to describe the UEs 12 or 14. The wireless communication network 100 may be a heterogeneous technology network in which different types of eNBs or gNBs provide coverage for various geographical regions. For example, each network entity 20 or gNB may provide communication coverage for a macro cell, a small cell, or other types of cell. The term "cell" is a 3GPP term that may be used to describe a base station, a carrier, or component carrier (CC) associated with a base station, or a coverage area (e.g., sector, etc.) of a carrier or base station, depending on context.

A macro cell may generally cover a relatively large geographic area (e.g., several kilometers in radius) and may allow unrestricted access by UEs 12 or 14 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 12 or 14 with service subscriptions with the network provider. A femto cell may also cover a small geographic area (e.g., a home) and may provide restricted access and/or unrestricted access by UEs 12 or 14 having an association with the femto cell (e.g., in the restricted access case, UEs 12 or 14 in a closed subscriber group (CSG) of the network entity 20, which may include UEs 12 or 14 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on internet protocol (IP). A user plane protocol stack (e.g., packet data convergence protocol (PDCP), radio link control (RLC), media access control (MAC), etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, radio resource control (RRC) protocol layer may provide establishment, configuration, and maintenance of an RRC connection between a UE 12 or 14 and the network entities 20. The RRC protocol layer may also be used for core network 115 support of radio bearers for the user plane data. At the physical (PHY) layer, the transport channels may be mapped to physical channels.

The UEs 12 or 14 may be dispersed throughout the wireless communication network 100, and each UE 12 or 14 may be stationary or mobile. The UE 12 or 14 may be configured to establish one or more wireless communication links 135 with one or more network entities 20. The wireless communication links 135 shown in wireless communication network 100 may carry uplink (UL) transmissions from a UE 12 or 14 to a network entity 20, or downlink (DL) transmissions, from a network entity 20 to a UE 12 or 14. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, network entities 20 or UEs 12 or 14 may include multiple antennas 102 for employing antenna diversity schemes to improve communication quality and reliability between network entities 20 and UEs 12 or 14. Additionally or alternatively, network entities 20 or UEs 12 or 14 may employ multiple input multiple output (MIMO) techniques that may take advantage of multi-path environments to transmit multiple spatial layers carrying the same or different coded data.

Wireless communication network 100 may support operations on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 12 or 14 may be configured with multiple downlink CCs and one or more uplink CCs for carrier aggregation. Carrier aggregation may be used with both FDD and TDD component carriers. The network entities 20 and UEs 12 or 14 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communication network 100 may further include network entities 20 operating according to Wi-Fi technology, e.g., Wi-Fi access points, in communication with UEs 12 or 14 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of network entities 20 and/or UEs 12 or 14 may operate (according to 5G NR) at millimeter wave (mmW or mm-wave). For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, network entities 20 and/or UEs 12 or 14 operating according to the mmW technology may utilize beamforming in their transmissions to compensate for the extremely high path loss and short range.

According to the present aspects, referring to FIG. 1B, in a wireless communication system 100', the UE 12 and/or UE 14 may include one or more processors 103 and a memory 130 that may operate in combination with an uplink management component 40 to control a symbol generating component 42, a hopping management component 44, and/or a DMRS management component 46 for performing uplink management and transmissions as described herein.

For example, the uplink management component 40 may be configured to generate one-symbol or two-symbol UL signals and transmit from the UE (e.g., UE 12 or UE 14) to a network entity (e.g., network entity 20), and/or perform related UL signal management or operations. In an aspect, the term "component" as used herein may be one of the parts that make up a system, may be hardware, firmware, and/or software, and may be divided into other components. The uplink management component 40 may be communicatively coupled with a transceiver 106, which may include a receiver 32 for receiving and processing radio frequency (RF) signals and a transmitter 34 for processing and transmitting RF signals.

In some aspects, the uplink management component 40 may include the symbol generating component 42, hopping management component 44, and/or DMRS management component 46 for performing uplink management and transmissions. For example, the symbol generating component 42 may be configured to generate one or two symbols using a predetermined format for UL transmissions. In an example, the hopping management component 44 may be configured to create diversity via using configurable hopping (frequency hopping and/or sequence hopping) for the symbol(s). In an example, the DMRS management component 46 may be configured to manage or identify the DMRS in the symbols for UL transmissions. The processor 103 may be communicatively coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium, or non-transitory computer-readable storage medium). The receiver 32 may be, for example, a RF receiver. In an aspect, the receiver 32 may receive signals transmitted by another UE or network entity 20. The receiver 32 may obtain measurements of the signals, e.g., signal-to-noise ratio (SNR).

The transmitter 34 may include hardware, firmware, and/ or software code executable by a processor for transmitting data, the code comprising instructions and being stored in a memory (e.g., computer-readable medium). The transmitter 34 may be, for example, a RF transmitter.

In an aspect, the one or more processors 103 can include a modem 108 that uses one or more modem processors. The various functions related to the Uplink management component 40 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the uplink management component 40, including the symbol generating component 42, hopping management component 44, and/or DMRS management component 46.

The uplink management component 40, symbol generating component 42, hopping management component 44, and/or DMRS management component 46 may include hardware, firmware, and/or software code executable by a processor for performing random access management and operations. For example, the hardware may include, for example, a hardware accelerator, or specialized processor.

Moreover, in an aspect, the UE 12 and/or UE 14 may include a RF front end 104 and transceiver 106 for receiving and transmitting radio transmissions, for example, wireless communications 26. For example, the transceiver 106 may receive a signal that includes information of the allocated resources for the UE 12 and/or other UEs (e.g., the UE 14). Depending on the UE behavior discussed herein, the transceiver 106 may transmit an UL signal having one or more symbols to the network entity 20 (e.g., PUSCH, PUCCH, data, or control information such as UCI). For example, the transceiver 106 may communicate with modem 108 to transmit messages generated by the uplink management component 40 and/or to receive messages and forward them to uplink management component 40.

The RF front end 104 may be coupled with one or more antennas 102 and can include one or more low-noise amplifiers (LNAs) 141, one or more switches 142, 143, 146, one or more power amplifiers (PAs) 145, and one or more filters 144 for transmitting and receiving RF signals. In an aspect, components of RF front end 104 can be coupled with transceiver 106. The transceiver 106 may be coupled with one or more modems 108 and processor 103.

In an aspect, the LNA 141 can amplify a received signal at a desired output level. In an aspect, each LNA 141 may have a specified minimum and maximum gain values. In an aspect, the RF front end 104 may use one or more switches 142, 143 to select a particular LNA 141 and a specified gain value based on a desired gain value for a particular application. In an aspect, the RF front end 104 may provide measurements (e.g., Energy to Interference Ratio (Ec/Io), Reference Signal Received Quality (RSRQ), Signal to Interference-plus-Noise Ratio (SINR)) and/or apply gain values to the uplink management component 40.

Further, for example, one or more PA(s) 145 may be used by the RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and a specified gain value based on a desired gain value for a particular application.

Also, for example, one or more filters 144 may be used by the RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be connected to a specific LNA 141 and/or PA 145. In an aspect, the RF front end 104 may use one or more switches 142, 143, 146 to select a transmit or receive path using a specified filter 144, LNA, 141, and/or PA 145, based on a configuration as specified by transceiver 106 and/or processor 103.

The transceiver 106 may be configured to transmit and receive wireless signals through an antenna 102 via the RF front end 104. In an aspect, the transceiver may be tuned to operate at specified frequencies such that the UE 12 and/or UE 14 can communicate with, for example, the network entity 20. In an aspect, for example, the modem 108 can configure the transceiver 106 to operate at a specified frequency and power level based on the UE configuration of the UE 12 and/or UE 14 and communication protocol used by modem 108.

In an aspect, the modem 108 can be a multiband-multimode modem, which can process digital data and communicate with the transceiver 106 such that the digital data is sent and received using the transceiver 106. In an aspect, the modem 108 can be multiband and be configured to support multiple frequency bands for a specific communications protocol. In an aspect, the modem 108 can be multimode and be configured to support multiple operating networks and communications protocols. In an aspect, the modem 108 can control one or more components of the UE 12 and/or UE 14 or the network entity 20 (e.g., RF front end 104, transceiver 106) to enable transmission and/or reception of signals based on a specified modem configuration. In an aspect, the modem configuration can be based on the mode of the modem and the frequency band in use. In another aspect, the modem configuration can be based on UE configuration information associated with the UE 12 and/or UE 14 as provided by the network during cell selection and/or cell reselection.

The UE 12 and/or UE 14 may further include memory 130, such as for storing data used herein, and/or local versions of applications or uplink management component 40, and/or one or more subcomponents of the uplink management component 40 being executed by processor 103. The memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, the memory 130 may be a computer-readable storage medium that stores one or more computer-executable codes defining the uplink management component 40 and/or one or more of its subcomponents, and/or data associated therewith, when the UE 12 and/or UE 14 is operating the processor 103 to execute the uplink management component 40 and/or one or more of the subcomponents of the uplink management component 40. In another aspect, for example, the memory 130 may be a non-transitory computer-readable storage medium.

Referring to FIG. 1C, similarly to FIG. 1B, in a wireless communication system 100", the network entity 20 may include one or more processors 103 and a memory 130 that may operate in combination with a communication management component 50 to control a hopping configuration component 52, a symbol management component 54, and/or a decoder 56 for performing uplink management and receptions as described herein.

For example, the communication management component 50 may be receive one-symbol or two-symbol UL signals from a UE (e.g., UE 12 or UE 14), and/or perform related UL signal management or operations (e.g., decoding the received UL signals). In an aspect, the term "component" as used herein may be one of the parts that make up a system, may be hardware, firmware, and/or software, and may be divided into other components. The communication management component 50 may be communicatively coupled with a transceiver 106, which may include a receiver 32 for receiving and processing RF signals and a transmitter 34 for processing and transmitting RF signals, which are similar to the components in FIG. 1B.

In some aspects, for example, the communication management component 50 may include the hopping configuration component 52, symbol management component 54, and/or decoder 56 for performing uplink management and receptions. For example, the hopping configuration component 52 may configure hopping (frequency hopping and/or sequence hopping) for the UE to generate symbol(s) (via symbol management component 54) for UL transmissions. In an aspect, the hopping configuration component 52 may transmit, via transmitter 34, hopping information (e.g., the hopping configuration) to the UE 12 or 14 to indicate whether hopping is enabled or disabled, and/or to indicate the hopping is frequency hopping or sequence hopping. In an example, the symbol management component 54 may be configured to receive one or more symbols in an UL signal. In another example, the decoder 46 may be configured decode the received one or more UL symbols based on at least one predetermined format. The processor 103 may be communicatively coupled with the transceiver 106 and memory 130 via at least one bus 110.

Moreover, in an aspect, the network entity 20 may include a RF front end 104 and transceiver 106 for receiving and transmitting radio transmissions, for example, wireless communications 26. For example, the transceiver 106 may transmit a signal that includes information of the allocated resources for the UE 12 and/or other UEs (e.g., the UE 14). The transceiver 106 may receive an UL signal having one or more symbols from the UE 12 or 14 (e.g., PUSCH, PUCCH, data, or control information such as UCI). In some examples, the transceiver 106 may communicate with modem 108 to transmit messages generated by the communication management component 50 and/or to receive messages and forward them to communication management component 50.

The RF front end 104 may be coupled with one or more antennas 102 and can include one or more LNAs 141, one or more switches 142, 143, 146, one or more PAs 145, and one or more filters 144 for transmitting and receiving RF signals. In an aspect, components of RF front end 104 can be coupled with transceiver 106. The transceiver 106 may be coupled with one or more modems 108 and processor 103.

Figure 2A:
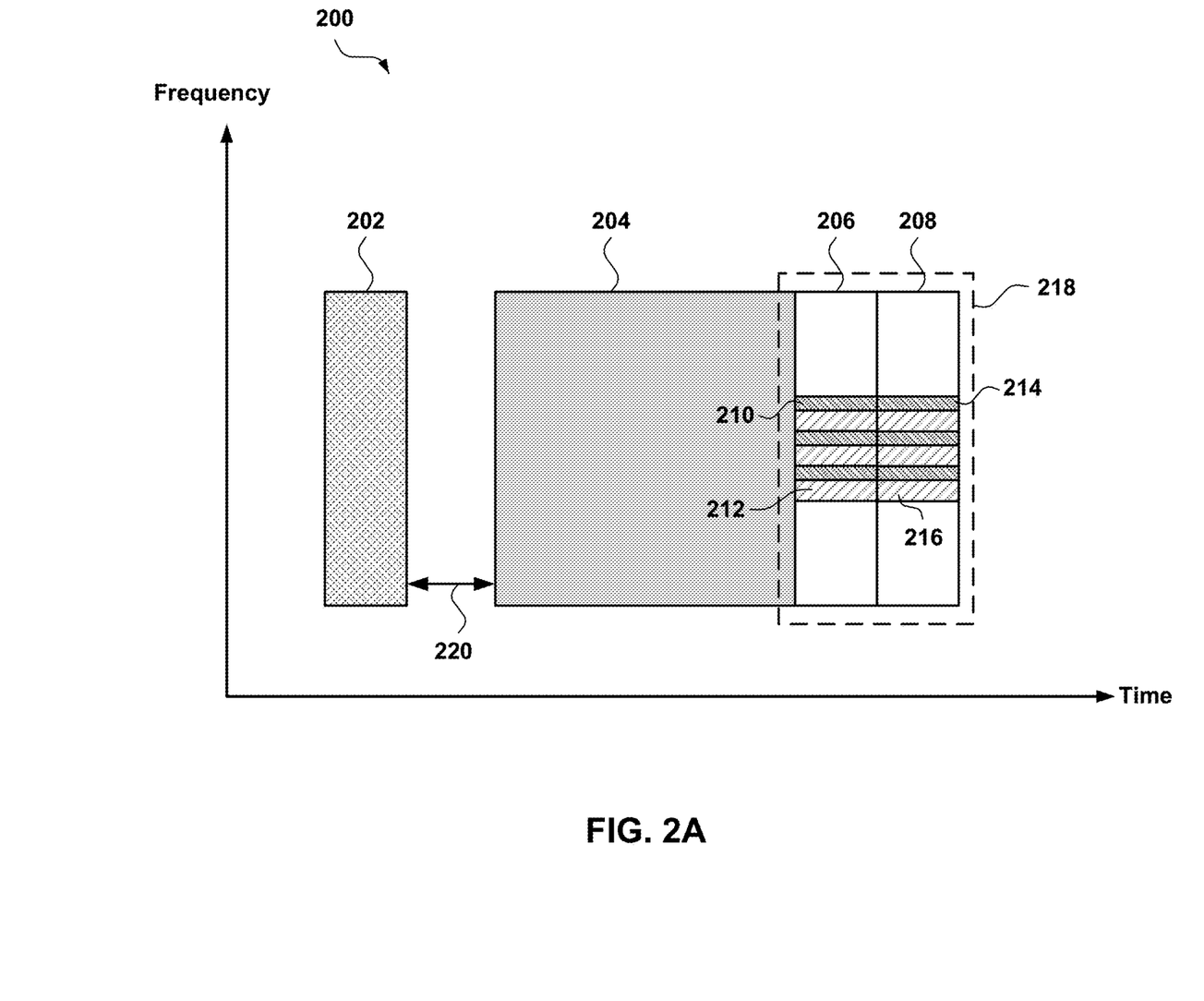
FIG. 2A is a first example of UL transmissions from a UE, according to one or more of the presently described aspects.

Referring to FIG. 2A, in an aspect, for example, an UL transmission scheme 200 may be used for UL transmissions by a UE (e.g., UE 12 or UE 14 in FIG. 1A, FIG. 1B, or FIG. 1C) to a network entity (e.g., network entity 20 in FIG. 1A, FIG. 1B, or FIG. 1C). In an aspect, the UE may monitor, detect, or receive a DL signal 202, for example, a DL control channel such as physical downlink control channel (PDCCH). In some examples, the DL signal 202 may include DL control information (DCI), and/or resource allocation for Physical Downlink Shared Channel (PDSCH), PUSCH, and/or PUCCH. In some cases, there may be a gap 220 (a time period) between the DL signal 202 and the next signal.

In an aspect, for example, after the gap 220, the UE may generate and transmit one or more UL symbols. In an example, the UE may generate an ULSB 218 including one or two symbols, and may transmit the ULSB 218 alone without an UL long burst. In another example, the UE may generate and transmit an UL long burst 204 after the gap 220, as shown in FIG. 2A. In some cases, the UL long burst 204 may include 12 or 13 symbols, and may carry data, PUSCH, and/or PUCCH (including UCI). In some cases, one or two symbols may form an ULSB 218, which may be configured to be transmit before the UL long burst 204, in between two UL long bursts (e.g., between two 6-symbol UL long bursts), or immediately after the UL long burst 204 (e.g., can be considered as the last two symbols of an UL signal having 14 symbols). In an example, the ULSB 218 may include a first symbol 206 and a second symbol 208. In some cases, the first symbol 206 or the second symbol 208 may carry PUCCH, PUSCH, and/or PDSCH. In an example, the first symbol 206 may have a format that is either sequence-based or FDM-based, as discussed above.

In another aspect, the second symbol 208 may be a repetition of the first symbol 206. In an example, the UE may generate the second symbol 208 based on the format of the first symbol 206, using a same tone index as shown in FIG. 2A. In particular, for example, both the first symbol 206 and the second symbol 208 may have a same fixed or predetermined DMRS tone configuration (or arrangement) based on the tone index, which is known to the UE. In this example, DMRS tones 210 in the first symbol 206 and DMRS tones 214 in the second symbol 208 may have same frequency (tone/sub-carrier) locations (e.g., Sub-carrier No. 1, Sub-carrier No. 4, Sub-carrier No. 7, Sub-carrier No. 10), while the other tones/sub-carriers 212 and 216, may be used for control information or data transmissions, as shown in FIG. 2A.

Figure 2B:
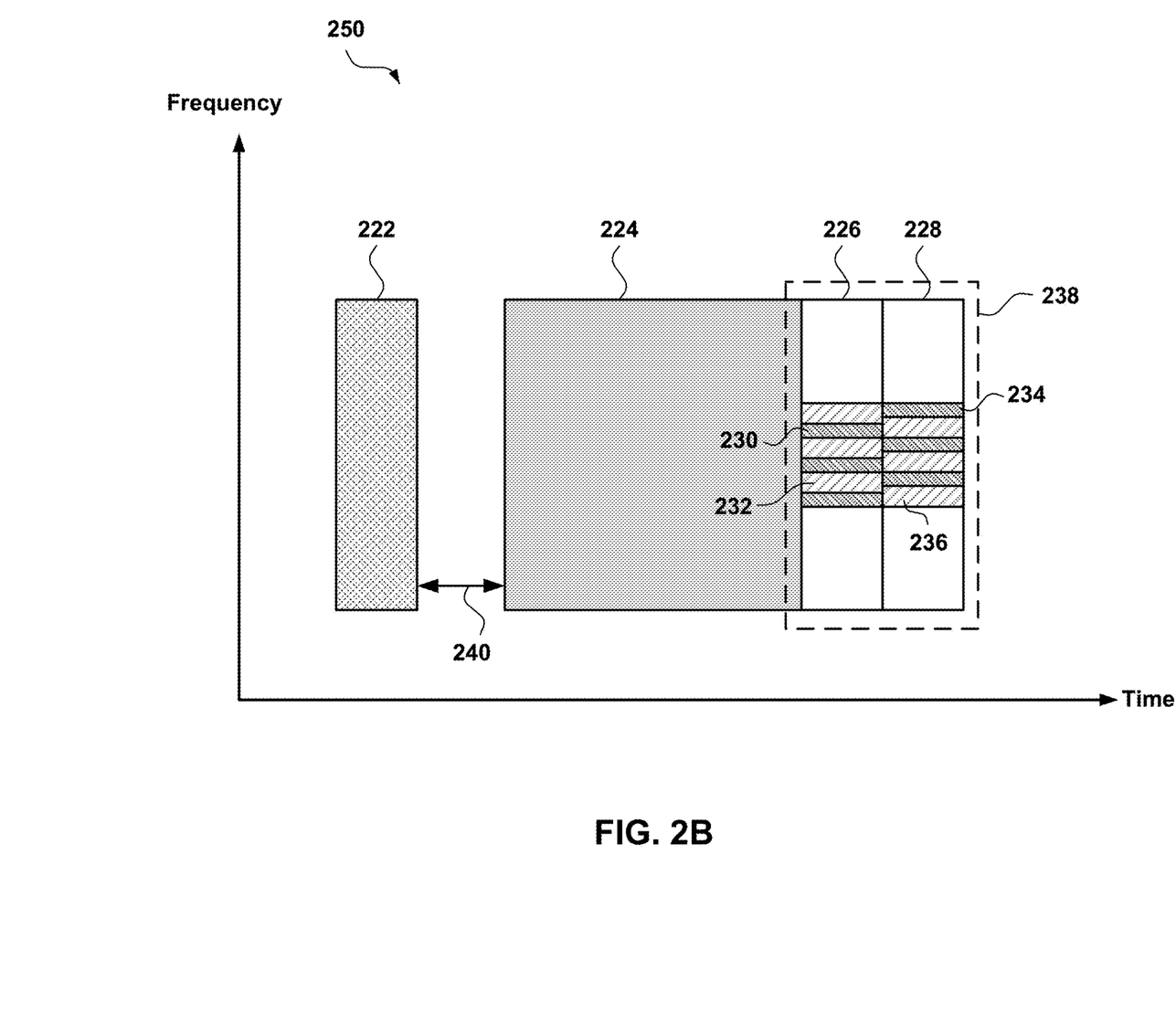
FIG. 2B is a second example of UL transmissions from a UE, according to one or more of the presently described aspects.

Referring to FIG. 2B, in an aspect, for example, an UL transmission scheme 250 may be used for UL transmissions by the UE (e.g., UE 12 or UE 14 in FIG. 1A) to the network entity (e.g., network entity 20 in FIG. 1B). In an aspect, the UE may monitor, detect, or receive a DL signal 222. In some cases, there may be a gap 240 (a time period) between the DL signal 222 and the next signal.

In an aspect, for example, after the gap 240, the UE may generate and transmit one or more UL symbols. In an example, the UE may generate an ULSB 238 including one or two symbols, and may transmit the ULSB 238 alone without an UL long burst. In another example, the UE may generate and transmit an UL long burst 224 after the gap 240, as shown in FIG. 2B. In some cases, the UL long burst 224 may include 12 or 13 symbols, and may carry data, PUSCH, and/or PUCCH (including UCI). In some cases, one or two symbols may form an ULSB 238, which may be configured to be transmit before the UL long burst 224, in between two UL long bursts (e.g., between two 6-symbol UL long bursts), or immediately after the UL long burst 224 (e.g., can be considered as the last two symbols of an UL signal having 14 symbols). In an example, the ULSB 238 may include a first symbol 226 and a second symbol 228. In some cases, the first symbol 226 or the second symbol 228 may carry PUCCH, PUSCH, and/or PDSCH. In an example, the first symbol 226 may have a format that is either sequence-based or FDM-based, as discussed above.

In some examples, the UE may be configured to enable or enhance diversity (e.g., channel diversity, or interference diversity). In an example, the UE may be configured to perform frequency hopping and/or sequence hopping when generating one or more symbols for UL transmissions. A network entity (e.g., the network entity 20) may enable or disable frequency hopping and/or sequence hopping, for example, based on a predetermined configuration, or a predetermined format used by the UE for UL symbol generation. In an aspect, for frequency hopping, the UE may obtain a RB index from the network entity (e.g., network entity 20), and/or the configurable hopping information, and generate the second symbol 228, for example, using different RBs, and/or different frequency (tone/sub-carrier) locations for reference signals (e.g., DMRS) or data transmissions, based on the obtained information or configurations. For instance, as shown in the ULSB 238, DMRSs 234 and tones 236 (e.g., used for data or control information) in the second symbol 228 may be frequency-hopped in view of DMRSs 230 and tones 232 (e.g., used for data or control information) in the first symbol 226.

In another aspect, sequence hopping may be used by the UE to increase interference diversity. In one implementation of Format 0, the UE may use one sequence for "ACK," and another sequence for "NACK." In an example, the sequences in the first symbol 226 and the second symbol 228 may use sequence-based design and have low peak-to-average power ratio (PAPR). In this example, the sequence for "ACK" hypothesis in the second symbol in the ULSB may be different from the sequence for "ACK" hypothesis in the first symbol. Similarly, the sequence for other hypothesis may also be different between the two symbols. The different sequences may be the same base sequence with different cyclic shift indices. In another example of Format 2, DMRS sequence hopping may be used for DMRSs in the second symbol 228 having FDM-based design. In some cases, the sequences used for DMRSs are known sequences to the UE and/or the network entity. In an aspect, scrambling sequence hopping may be used for data tones in FDM-based design.

In some examples, if frequency hopping is disabled by the network entity or not used by the UE, the two-symbol UL signal may use a same DMRS ratio (e.g., one third (⅓) of the 12 tones) as the one-symbol UL signal. For example, if 4 tones/sub-carriers are used for DMRS in one-symbol design, in order to keep the same DMRS ratio (⅓), each symbol of a two-symbol design has 4 DMRS tones/sub-carriers. In another example, the UE may generate shared DMRS tones between two symbols (e.g., symbols 206 and 208) for better channel estimation (e.g., performed at the network entity 20). In some cases, DMRS tones may occupy the same frequency locations (or sub-carriers) in the two symbols (e.g., symbols 226 and 228). In some cases, DMRS tones may occupy different frequency locations (or sub-carriers) in the two symbols (e.g., symbols 226 and 228).

In some other examples, the UE may use lower DMRS ratio for the two-symbol UL signal than the DMRS ratio used by the one-symbol UL signal. For example, in the two-symbol UL signal, a plurality of DMRS tones may be used in the first symbol (e.g., same as one-symbol UL signal), and less or no DMRS tones (compared with the plurality of DMRS tones in the first symbol) being used in the second symbol. In another example, DMRS tones may be used in every 2 tones in a one-symbol UL signal. In some cases, DMRS tones may be used in every 4 tones in a two-symbol UL signal, and the DMRS tones may occupy different location combinations in the two symbols.

In some other examples, the UE may have an average of DMRS tones in the two consecutive symbols that is less than a number of DMRS tones in a single symbol transmission. For example, the first symbol can have 3 DMRS tones and the second symbol can have 1 DMRS tone or the first symbol can have 1 DMRS tone and the second symbol can have 3 DMRS tones. In another example, the first symbol can have 4 DMRS tones and the second symbol can have 0 DMRS tones or the first symbol can have 0 DMRS tones and the second symbol can have 4 DMRS tones. In yet another example, the first symbol can have 2 DMRS tones and the second symbol can have 2 DMRS tones. Thus, in these examples, the average DMRS tones in the first symbol and the second symbol is 2 DMRS tones which is less the number of DMRS tones in a single symbol, e.g., 4 DMRS tones.

Figure 3:
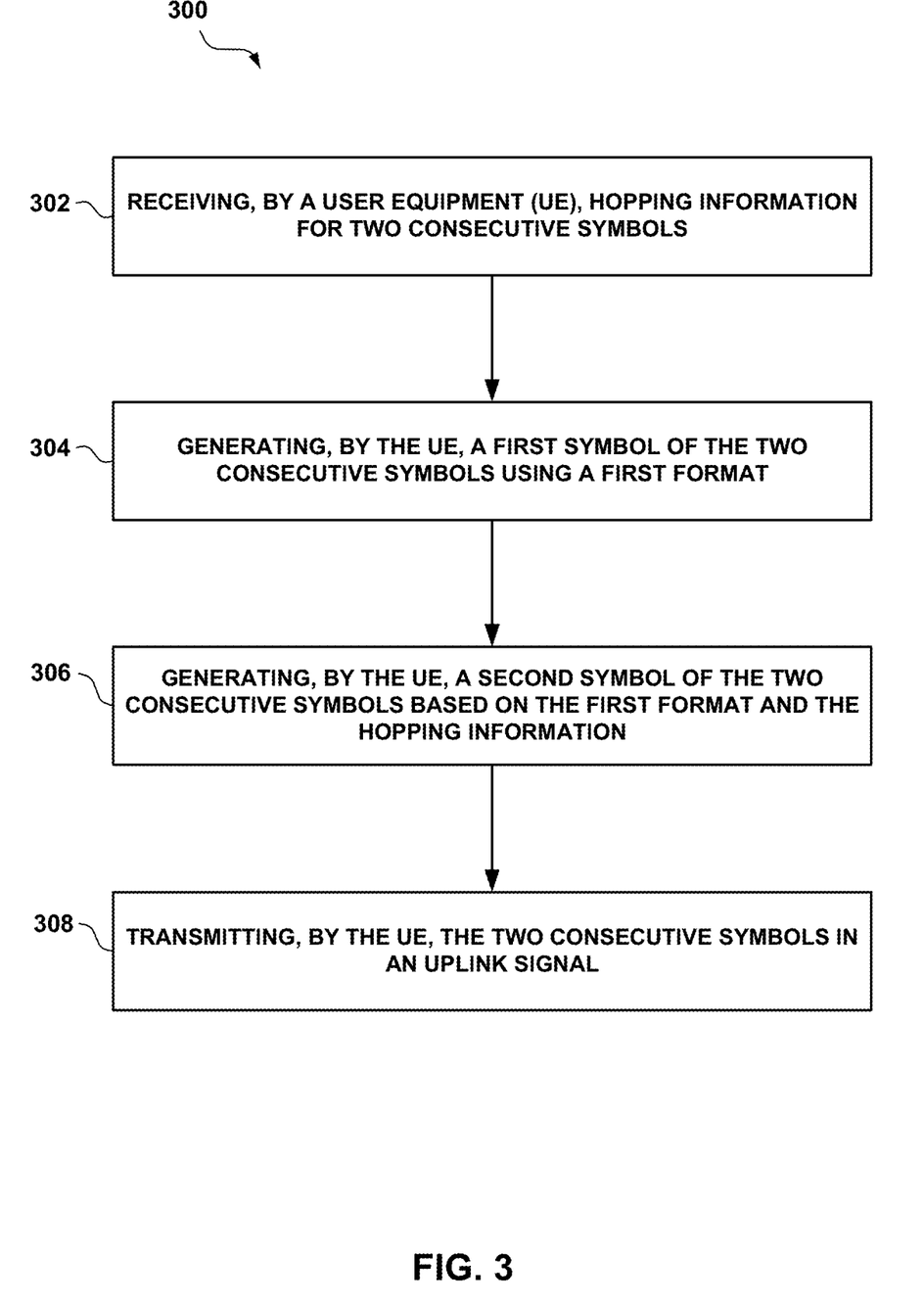
FIG. 3 is a flow diagram of an example method used by a UE for UL signal transmissions, according to one or more of the presently described aspects.

Referring to FIG. 3, in an operational aspect, a UE (e.g., UE 12 or UE 14) may perform one or more aspects of a method 300 for uplink transmissions in a wireless communication system. For example, one or more of the processors 103, the memory 130, the modem 108, the transceiver 106 (e.g., the receiver 32 and/or transmitter 34), the uplink management component 40, symbol generating component 42, hopping management component 44, and/or DMRS management component 46, may be configured to perform one or more aspects of the method 300.

In an aspect, at block 302, the method 300 may include receiving, by a UE, hopping information for two consecutive symbols. In an aspect, for example, the uplink management component 40, and/or the hopping management component 44, e.g., in conjunction with one or more of the processors 103, the memory 130, the modem 108, and/or the receiver 32, may be configured to receive, via the receiver 32, hopping information (e.g., from network entity 20) used for generating two consecutive symbols. In an example, the two consecutive symbols may be sequence-based symbols or FDM-based symbols. In some cases, the hopping management component 44 may be configured to determine whether hopping is configurable, enabled, or disabled based on the received hopping information.

In an aspect, at block 304, the method 300 may include generating, by the UE, a first symbol of the two consecutive symbols using a format. In an aspect, for example, the uplink management component 40, and/or the symbol generating component 42, e.g., in conjunction with one or more of the processors 103, the memory 130, the modem 108, and/or the receiver 32, may be configured to generate a first symbol using a predetermined or known format. In some examples, the first symbol is a sequence-based symbol or a FDM-based symbol. In an aspect, the format may be or comprise a tone index indicating the type of signal (e.g., data, DMRS, etc.) to be carried on each tone (e.g., a tone/sub-carrier of 12 tones). For example, the symbol generating component 42 and/or DMRS management component 46 may use the tone index to determine DMRS tone configuration (or arrangement) in the first symbol.

In an aspect, at block 306, the method 300 may include generating, by the UE, a second symbol of the two consecutive symbols based on the format and the hopping information. In an aspect, for example, the uplink management component 40, symbol generating component 42, and/or hopping management component 44, e.g., in conjunction with one or more of the processors 103, the memory 130, the modem 108, and/or the transceiver 106, may be configured to generate a second symbol of the two consecutive symbols based on the format and the hopping information. In an example, the second symbol is a sequence-based symbol or a FDM-based symbol.

In some examples, the symbol generating component 42 and/or the hopping management component 44, may be configured to generate the second symbol using configurable hopping based on the format, and the configurable hopping may be frequency hopping or sequence hopping. In some cases, the UE may determine whether hopping is disabled based on the received hopping information, and may generate the second symbol as a repetition of the first symbol in response to a determination that hopping is disabled. In some other cases, the UE may determine whether hopping is enabled based on the received hopping information, and generate the second symbol using frequency hopping or sequence hopping in response to a determination that hopping is enabled.

In an aspect, at block 308, the method 300 may include transmitting, by the UE, the two consecutive symbols in an uplink signal. In an aspect, for example, the uplink management component 40, e.g., in conjunction with one or more of the processors 103, the memory 130, the modem 108, and/or the transmitter 34, may be configured to transmit, via the transmitter 34, the two consecutive symbols in one or more uplink signals. For examples, the first symbol and the second symbol may be transmitted consecutively in an uplink signal having PUSCH or PUCCH.

In some examples, the uplink management component 40 may be configured to transmit, via the transmitter 34, the two consecutive symbols in conjunction with transmitting another twelve symbols. For example, the two consecutive symbols may be transmitted immediately after transmitting twelve consecutive symbols (e.g., as shown in FIG. 2A and FIG. 2B). In another example, the two consecutive symbols may be transmitted before, or in between transmitting twelve symbols.

Figure 4:
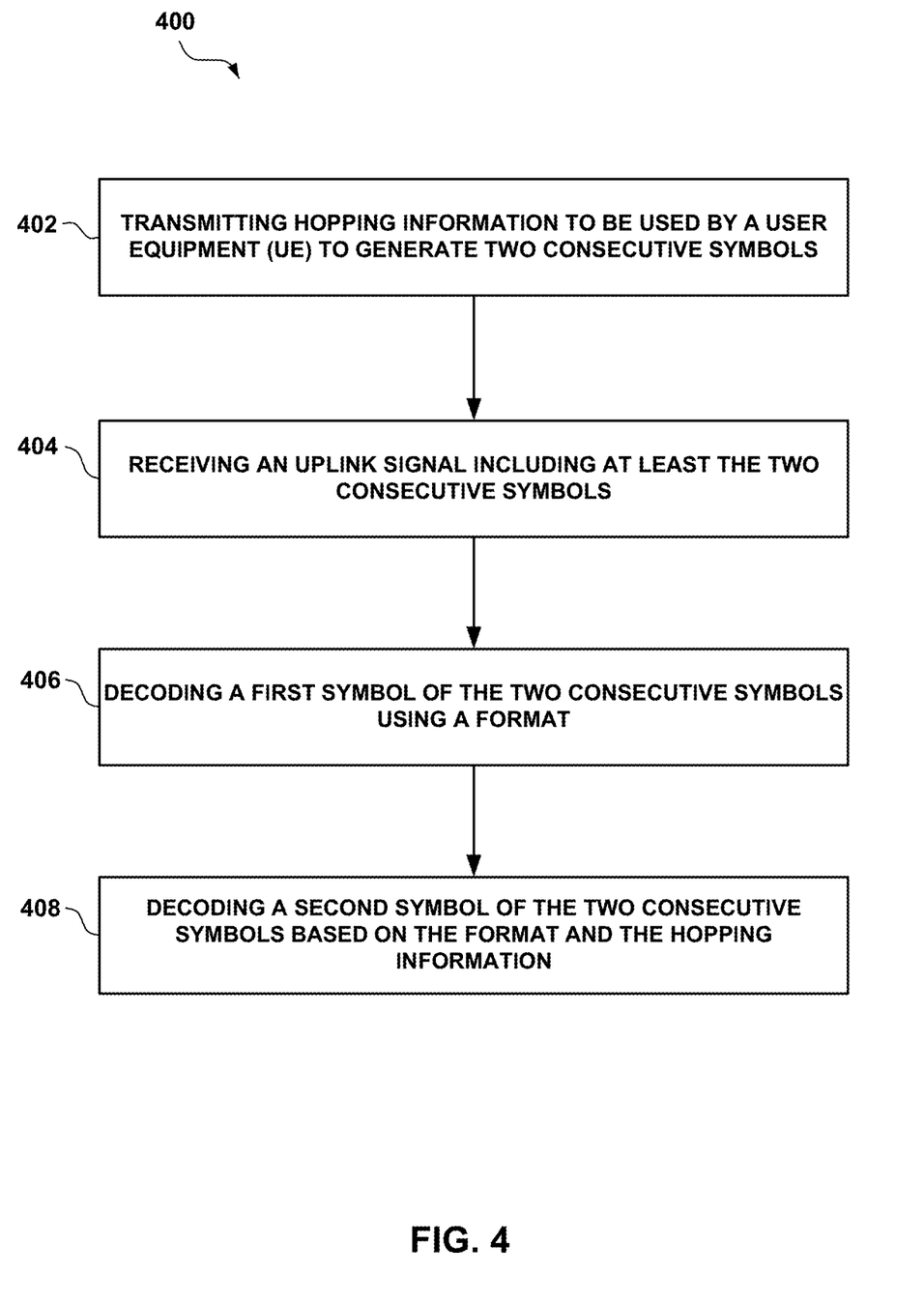
FIG. 4 is a flow diagram of an example method used by a network entity for UL signal receptions, according to one or more of the presently described aspects.

Referring to FIG. 4, in another operational aspect, a network entity (e.g., network entity 20) may perform one or more aspects of a method 400 for uplink signal receptions in a wireless communication system. For example, one or more of the processors 103, the memory 130, modem 108, transceiver 106 (e.g., the receiver 32 and/or transmitter 34), the communication management component 50, hopping configuration component 52, symbol management component 54, and/or decoder 56, may be configured to perform one or more aspects of the method 400.

In an aspect, at block 402, the method 400 may include transmitting hopping information to be used by a UE to generate two consecutive symbols. In an aspect, for example, the communication management component 50, and/hopping configuration component 52, e.g., in conjunction with one or more of the processors 103, the memory 130, the modem 108, and/or the transmitter 34, may be configured to transmit, via the transmitter 34, hopping information to be used by a UE to generate two consecutive symbols for uplink transmission. In some examples, the hopping information may indicate that hopping is configurable. For example, the hopping information may indicate whether frequency hopping or sequence hopping is enabled or disabled.

In some examples, the communication management component 50, hopping configuration component 52, and/or symbol management component 54, e.g., in conjunction with one or more of the processors 103, the memory 130, the modem 108, and/or the transceiver 106 (e.g., the receiver 32 and/or transmitter 34), may be configured to transmit, via transmitter 34, a message indicating configurable hopping to be used by the second symbol, and the configurable hopping comprises frequency hopping or sequence hopping. In addition, the UE may be configured to receive, via the receiver 32, the second symbol having the frequency hopping or the sequence hopping based on the format. In some cases, the message may be used to indicate configurable hopping or hopping information, and may be transmitted in a control channel (e.g., PDCCH, the DL signal 202 or 222) from the network entity 20 to the UE 12 or 14.

In an aspect, at block 404, the method 400 may include receiving an uplink signal including at least the two consecutive symbols. In an aspect, for example, the communication management component 50, and/or symbol management component 54, e.g., in conjunction with one or more of the processors 103, the memory 130, the modem 108, and/or the receiver 32, may be configured to receive, via the receiver 32, an uplink signal including at least the two consecutive symbols. In some examples, the two consecutive symbols may be received in conjunction with receiving another twelve symbols in the uplink signal.

In an aspect, at block 406, the method 400 may include decoding a first symbol of the two consecutive symbols using a format. In an aspect, for example, the communication management component 50, symbol management component 54, and/or decoder 56, e.g., in conjunction with one or more of the processors 103, the memory 130, the modem 108, and/or the transceiver 106, may be configured to decode a first symbol of the two consecutive symbols using a format. In an aspect, the format may be or comprise a tone index indicating the type of signal (e.g., data, DMRS, etc.) to be carried on each tone (e.g., a tone/sub-carrier of 12 tones). For example, the symbol management component 54 and/or decoder 56 may use the tone index to determine DMRS tone configuration (or arrangement) in the first symbol.

In an aspect, at block 408, the method 400 may include decoding a second symbol of the two consecutive symbols based on the format and the hopping information. In an aspect, for example, the communication management component 50, symbol management component 54, and/or decoder 56, e.g., in conjunction with one or more of the processors 103, the memory 130, the modem 108, and/or the transceiver 106, may be configured to decode a second symbol of the two consecutive symbols based on the format and the hopping information.

In an aspect, both the first symbol and the second symbol of the two consecutive symbols can be decoded, e.g., at the same time, based on the format and the hopping information. In an aspect, for example, the communication management component 50, symbol management component 54, and/or decoder 56, e.g., in conjunction with the one or more of the processors 103, the memory 130, the modem 108, and/or the transceiver 106, may be configured to decode both the first symbol and the second symbol of the two consecutive symbols, e.g., at the same time, based on the format and the hopping information. For example, the first symbol and the second symbol can be decoded as if they are one symbol.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to an LTE/LTE-A or a 5G communication system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications, comprising:
    receiving, by a user equipment (UE), hopping information for generating two consecutive symbols in a two symbol uplink short burst (ULSB), the hopping information including an index of a resource block associated with frequency hopping;
    generating, by the UE, a first symbol of the two consecutive symbols using an uplink format associated with the two symbol ULSB;
    generating, by the UE, a second symbol of the two consecutive symbols based on the uplink format associated with the two symbol ULSB and the hopping information; and
    transmitting, by the UE, the two consecutive symbols in an uplink signal.

2. The method of claim 1, wherein transmitting the two consecutive symbols comprises transmitting the two consecutive symbols before transmitting other uplink (UL) symbols.

3. The method of claim 1, wherein the first symbol or the second symbol is a sequence-based symbol or a frequency division multiplexing (FDM)-based symbol.

4. The method of claim 1, wherein generating the first symbol and generating the second symbol further comprises generating the first symbol and generating the second symbol with a same tone index for each.

5. The method of claim 1, further comprising:
    determining, by the UE, whether frequency hopping is disabled based on the received hopping information.

6. The method of claim 1, further comprising:
    determining, by the UE, whether frequency hopping is disabled based on the received hopping information,
    wherein an average of DMRS tones in the two consecutive symbols is less than a number of DMRS tones in a single symbol transmission.

7. The method of claim 1, further comprising:
    determining, by the UE, whether frequency hopping is enabled based on the received hopping information,
    wherein generating the second symbol comprises generating the second symbol using frequency hopping or sequence hopping in response to a determination that frequency hopping is enabled.

8. The method of claim 1, wherein the uplink format associated with the two symbol ULSB comprises a tone index.

9. The method of claim 1, wherein the first symbol or the second symbol is a symbol of a Physical Uplink Control Channel (PUCCH) or a Physical Uplink Shared Channel (PUSCH).

10. The method of claim 1, wherein the hopping information for two consecutive symbols in the two symbol ULSB comprises hopping information for the second symbol of the two consecutive symbols.

11. The method of claim 1, further comprising receiving format information indicating the uplink format associated with the two symbol ULSB.

12. An apparatus for wireless communications, comprising:
    a transmitter configured to transmit signals;
    a receiver configured to receive signals;
    a memory configured to store instructions; and
    at least one processor communicatively coupled with the transmitter, the receiver, and the memory, wherein the at least one processor is configured to execute the instructions to:
        receive, via the receiver, hopping information for generating two consecutive symbols in a two symbol uplink short burst (ULSB), the hopping information including an index of a resource block associated with frequency hopping;
        generate a first symbol of the two consecutive symbols using an uplink format associated with the two symbol ULSB;
        generate a second symbol of the two consecutive symbols based on the uplink format associated with the two symbol ULSB and the hopping information; and
        transmit, via the transmitter, the two consecutive symbols in an uplink signal.

13. The apparatus of claim 12, wherein the at least one processor is configured to execute further instructions to transmit, via the transmitter, the two consecutive symbols before transmitting other uplink (UL) symbols.

14. The apparatus of claim 12, wherein the first symbol or the second symbol is a sequence-based symbol or an FDM-based symbol.

15. The apparatus of claim 12, wherein the generate the first symbol and the generate the second symbol, comprises generating the first symbol and generating the second symbol with a same tone index for each.

16. The apparatus of claim 12, wherein the at least one processor is configured to execute further instructions to:
    determine whether frequency hopping is disabled based on the received hopping information.

17. The apparatus of claim 12, wherein the at least one processor is configured to execute further instructions to:
    determine whether frequency hopping is disabled based on the received hopping information,
    wherein an average of DMRS tones in the two consecutive symbols is less than a number of DMRS tones in a single symbol transmission.

18. The apparatus of claim 12, wherein the at least one processor is configured to execute further instructions to:
  determine whether frequency hopping is enabled based on the received hopping information; and
  generate the second symbol using frequency hopping or sequence hopping in response to a determination that hopping is enabled.

19. The apparatus of claim 12, wherein the uplink format associated with the two symbol ULSB comprises a tone index.

20. The apparatus of claim 12, wherein the first symbol or the second symbol is a symbol of a PUCCH or a PUSCH.

21. The apparatus of claim 12, wherein the hopping information for two consecutive symbols in the two symbol ULSB comprises hopping information for the second symbol of the two consecutive symbols.

22. A method of wireless communications used by a network entity, comprising:
  transmitting hopping information to be used by a user equipment (UE) to generate two consecutive symbols in a two symbol uplink short burst (ULSB), the hopping information including an index of a resource block associated with frequency hopping;
  receiving an uplink signal including at least the two consecutive symbols;
  decoding a first symbol of the two consecutive symbols using an uplink format associated with the two symbol ULSB; and
  decoding a second symbol of the two consecutive symbols based on the uplink format associated with the two symbol ULSB and the hopping information.

23. The method of claim 22, wherein the two consecutive symbols are received in conjunction with receiving other uplink (UL) symbols.

24. The method of claim 22, wherein the hopping information indicates whether frequency hopping is enabled or disabled.

25. The method of claim 22, wherein the hopping information indicates whether frequency hopping or sequence hopping is enabled or disabled.

26. The method of claim 22, wherein the uplink format associated with the two symbol ULSB comprises a tone index.

27. The method of claim 22, wherein the first symbol or the second symbol is a symbol of a PUCCH or a PUSCH.

28. The method of claim 22, wherein the hopping information for two consecutive symbols in the two symbol ULSB comprises hopping information for the second symbol of the two consecutive symbols.

29. An apparatus for wireless communications, comprising:
  a transmitter configured to transmit signals;
  a receiver configured to receive signals;
  a memory configured to store instructions; and
  at least one processor communicatively coupled with the transmitter, the receiver, and the memory, wherein the at least one processor is configured to execute the instructions to:
    transmit, via the transmitter, hopping information to be used by a user equipment (UE) to generate two consecutive symbols in a two symbol uplink short burst (ULSB), the hopping information including an index of a resource block associated with frequency hopping;
    receive, via the receiver, an uplink signal including at least the two consecutive symbols;
    decode a first symbol of the two consecutive symbols using an uplink format associated with the two symbol ULSB; and
    decode a second symbol of the two consecutive symbols based on the uplink format associated with the two symbol ULSB and the hopping information.

30. The apparatus of claim 29, wherein the at least one processor is configured to execute further instructions to receive, via the receiver, the two consecutive symbols in conjunction with receiving other symbols in the uplink signal.

31. The apparatus of claim 29, wherein the hopping information indicates whether frequency hopping is enabled or disabled.

32. The apparatus of claim 29, wherein the hopping information indicates whether frequency hopping or sequence hopping is enabled or disabled.

33. The apparatus of claim 29, wherein the uplink format associated with the two symbol ULSB comprises a tone index.

34. The apparatus of claim 29, wherein the first symbol or the second symbol is a symbol of a PUCCH or a PUSCH.

35. The apparatus of claim 29, wherein the hopping information for two consecutive symbols in the two symbol ULSB comprises hopping information for the second symbol of the two consecutive symbols.

\* \* \* \* \*